Feb. 28, 1933.  E. BRUCE  1,899,410

DIRECTIVE ANTENNA SYSTEM

Filed Oct. 11, 1929  4 Sheets-Sheet 1

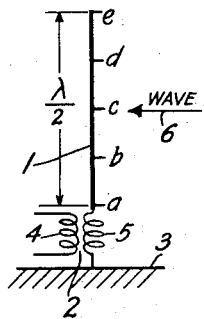

Fig. 1.

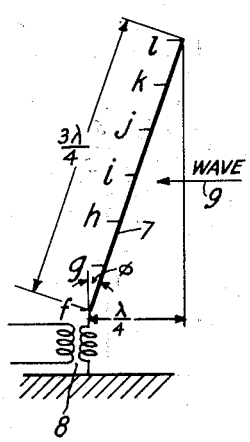

VECTOR DIAGRAM FOR ANTENNA OF FIG. 1.

| SEGMENT | INDUCED VOLTAGE | CURRENT THRU RECEIVER | |
|---|---|---|---|
| | | BY DIRECT PROPAGATION | BY REFLECTION |
| e | → | ← | → |
| d | → | ↙ | ↘ |
| c | → | ↓ | ↓ |
| b | → | ↘ | ↙ |
| a | → | → | ← |
| | | RESULTANT | |

TOTAL RESULTANT

Fig. 4.

VECTOR DIAGRAM FOR ANTENNA OF FIG.3

| SEGMENT | INDUCED VOLTAGE | CURRENT THRU RECEIVER | |
|---|---|---|---|
| | | BY DIRECT PROPAGATION | BY REFLECTION |
| l | → | ↑ | ↓ |
| k | ↘ | ↖ | ↗ |
| j | ↘ | ↖ | ↖ |
| i | ↘ | ← | ↑ |
| h | ↘ | ↙ | ↗ |
| g | ↘ | ↙ | ↘ |
| f | ↓ | ↓ | ↓ |
| TOTAL RESULTANT | | RESULTANT | |
| ← | | | =0 |

INVENTOR
E. BRUCE
BY
ATTORNEY

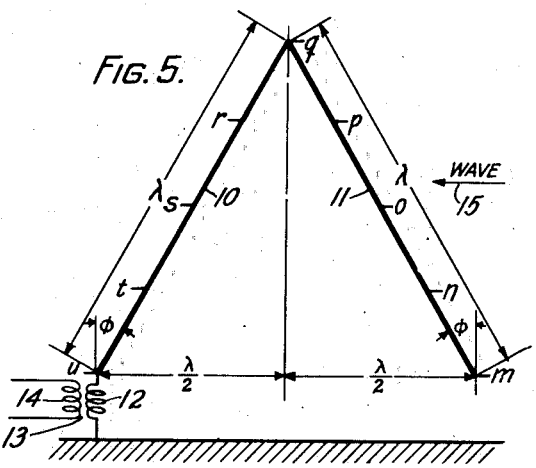
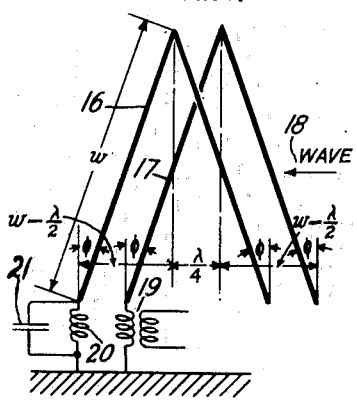
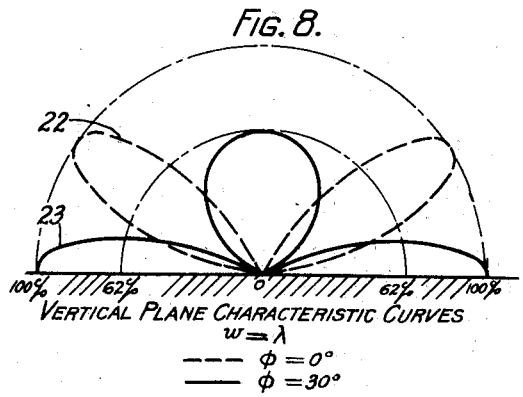

Feb. 28, 1933. E. BRUCE 1,899,410
DIRECTIVE ANTENNA SYSTEM
Filed Oct. 11, 1929  4 Sheets-Sheet 3
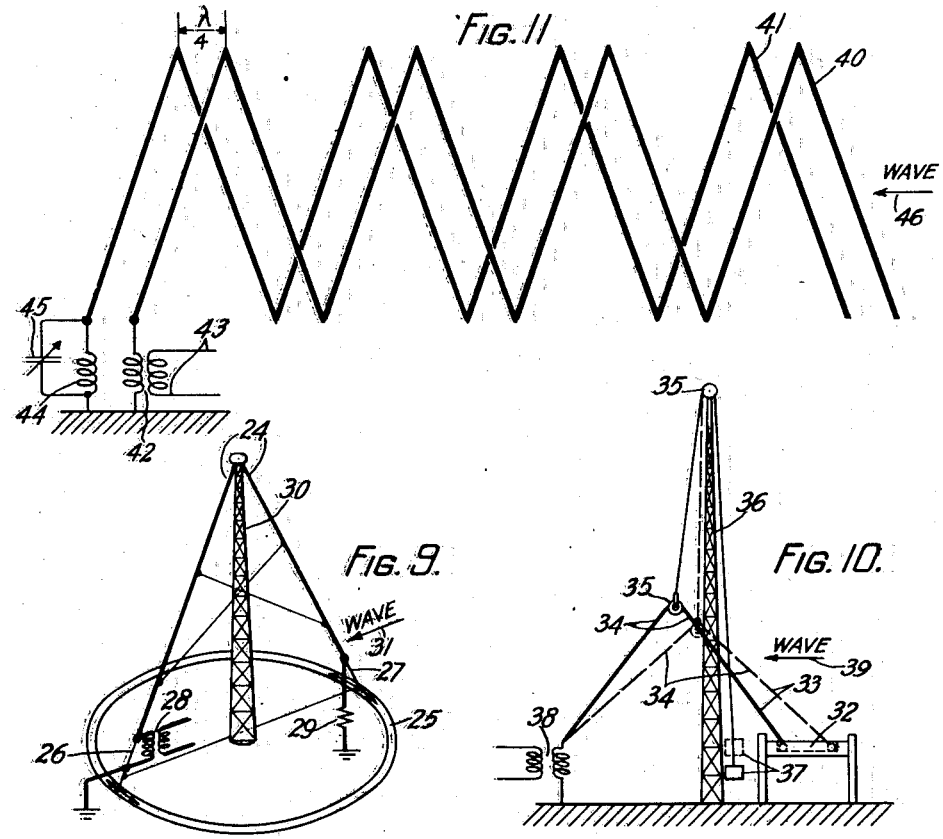
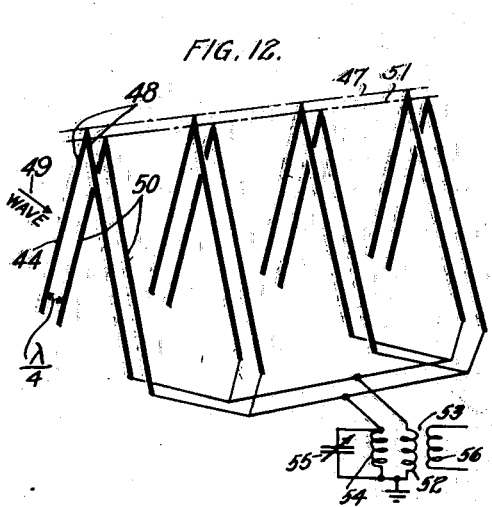
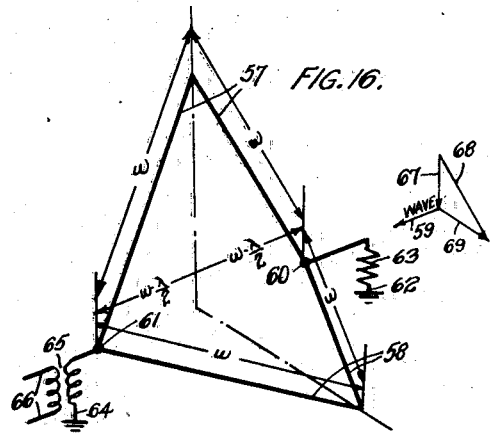
INVENTOR
E. BRUCE
BY
*Guy T. Morris*
ATTORNEY Feb. 28, 1933.   E. BRUCE   1,899,410
DIRECTIVE ANTENNA SYSTEM
Filed Oct. 11, 1929   4 Sheets-Sheet 4
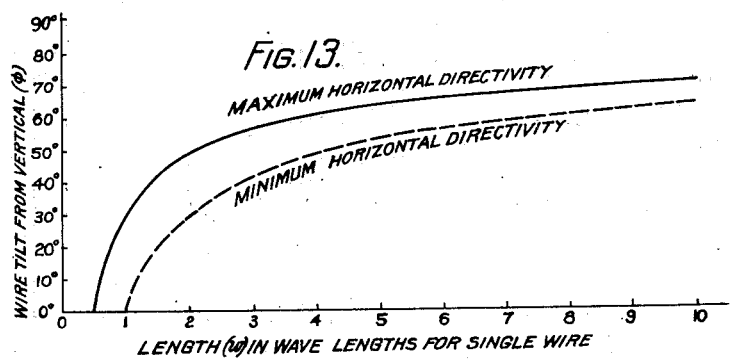
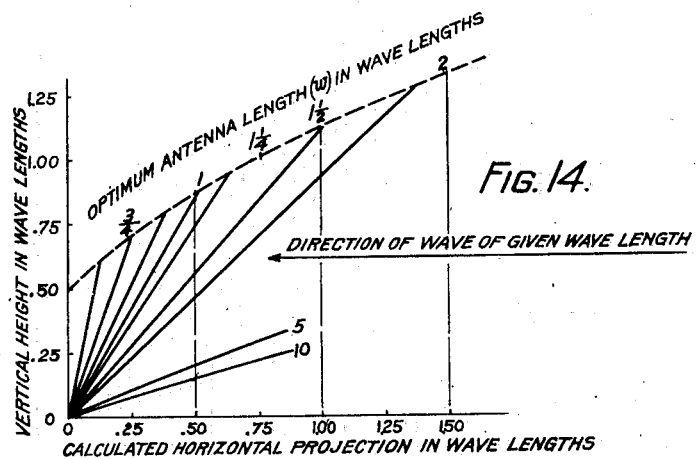
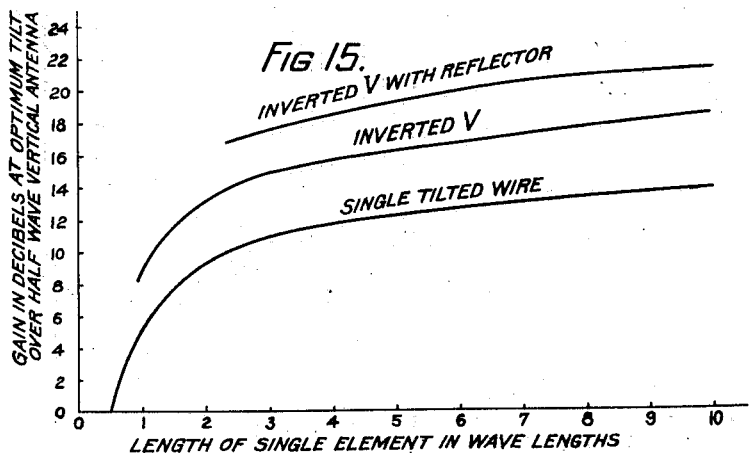
INVENTOR
E BRUCE
BY
ATTORNEY Patented Feb. 28, 1933

1,899,410

UNITED STATES PATENT OFFICE

EDMOND BRUCE, OF RED BANK, NEW JERSEY, ASSIGNOR TO BELL TELEPHONE LABORATORIES, INCORPORATED, OF NEW YORK, N. Y., A CORPORATION OF NEW YORK

DIRECTIVE ANTENNA SYSTEM

Application filed October 11, 1929. Serial No. 398,920.

This invention relates to aerial systems, and more particularly to directive antennæ for use in such systems.

An object of the invention is to render a directive antenna capable of effective operation over a considerable range of wave lengths. Another object of the invention is to increase the receiving effectiveness of an antenna. An additional object of the invention is to enable an antenna to have a desirably sharp selectivity both in a vertical plane and in a horizontal plane. A still further object is the reduction of fading in wave propagation.

It is well known that the most effective height for a simple vertical antenna with a ground connection at its lower end is one-half the wave length of the waves transmitted. This is because the elemental lengths of such an antenna absorb or emit, as the case may be, energies which conspire when superposed to yield a resultant that is greater in magnitude than may be had from a similarly excited similar antenna of shorter or longer length. It has been found, however, that the receiving effectiveness which is characteristic of a vertical half-wave length antenna may be retained and in fact enhanced by an increase in the length of the antenna accompanied by a definite tilt of the antenna toward or away from the remote cooperating sending station. The simple general rule is that the length of the tilted antenna should be equivalent to a half-wave length of the transmitted waves plus a length equal to the projection of the antenna on a plane parallel to the direction of the wave propagation. In the case of horizontally propagated waves and perfect ground, the length of the antenna should be equal to a half-wave length increased by the horizontal projection of the tilted antenna. If the ground is imperfect the length will be slightly different from the above.

It results also that in the case of a tilted antenna several wave lengths long, the effective response of the antenna varies but little with a considerable change in wave length of the transmitted waves, assuming that the energy of the transmitted waves and their direction of propagation remain unchanged. It is accordingly feasible to employ such an antenna in a system in which it is desirable or necessary to change wave lengths from time to time and this is an extremely important feature of the invention. It is also practical to combine the antenna with simple mechanical means for quickly changing the antenna tilt to the optimum angle simultaneously with a change in the wave length since, by this expedient, accommodation to different wave lengths of received waves may be achieved without change in length of the antenna or substitution of one antenna for another; and to combine the antenna with mechanical means for rotating the vertical plane of the antenna to the optimum position for radiating or absorbing energy.

Tilted antennæ constructed according to this invention readily lend themselves to various combinations and to use in arrays. Such an antenna suitably terminated exhibits a back-end effect which is relatively very small in comparison with its end-on directive selectivity.

Additional features of the invention and ends which it attains will be apparent from a perusal of the following specification taken in connection with the accompanying drawings in which;

Fig. 1 represents a vertical half-wave length antenna shown here merely for the purpose of explaining an incidental feature of the invention, Fig. 2 being a table showing in detail the vector currents for the antenna of Fig. 1;

Fig. 3 represents a three-quarter wave length antenna tilted at the optimum angle toward the incoming wave, Fig. 4 being a vector diagram for this antenna;

Fig. 5 illustrates an inverted V-type antenna comprising two tilted conductors or elements, Fig. 6 representing a vector diagram for such a system;

Fig. 7 is a double inverted V antenna comprising two single V-type antennæ;

Fig. 8 shows the vertical plane directional characteristic of a tilted single wire antenna and a vertical single wire antenna each one wave length long;

Fig. 9 represents schematically one system for combining an inverted V antenna section with means for rotating the vertical plane of the antenna to any desired direction;

Fig. 10 shows a single inverted V antenna section associated with means for changing the angle of tilt of each leg or element of the V section;

Figs. 11 and 12 represent, respectively, a unidirectional "end-on" and a unidirectional "broadside" antenna system each comprising an exciter and a reflector;

Figs. 13, 14 and 15 are curves for systems which employ the invention and are designed for a particular wave length. The curves in Fig. 13 show the relation between the angle of tilt of a single linear wire antenna and the length of the antenna in the cases of maximum and minimum horizontal directivity; the curve of Fig. 14 furnishes a means of determining the horizontal and vertical projections of different length antennæ, each tilted at the optimum angle for horizontal directivity; and the curves in Fig. 15 show the gain in decibels realized in using tilted antenna of the types and lengths indicated as compared to the results obtained with the half-wave vertical antenna; and Fig. 16 illustrates two inverted V-sections positioned in different planes and having common terminals.

Referring to Fig. 1, the reference numeral 1 designates a vertical half-wave length antenna which is associated with a radio translation device, such as a receiver or transmitter, by means of transformer 2 having windings 4 and 5. The lower terminal of the antenna is connected through winding 5 to the ground 3.

Assuming the direction of the incoming wave to be as shown by the arrow 6 the wave impinges on all elements such as $a$, $b$, $c$, $d$ and $e$ of the vertical antenna 1 at the same instant and therefore the various induced voltages are in phase with each other and may be assumed to have the directions indicated in the second column of Fig. 2. The current produced by the voltage in segment $e$ and directly propagated to winding 5 will require a time corresponding to a half cycle to travel from segment $e$ to the coil 5. Similarly, the current directly propagated from point $d$ will require a time corresponding to three-eighths of a cycle to reach winding 5 and currents directly propagated from points $c$, $b$ and $a$ will require a time corresponding to one-fourth, one-eighth and zero cycles, respectively, in arriving at winding 5. Assuming counter-clockwise rotation as positive or advancing the individual currents in winding 5, at the instant under consideration, are consequently retarded in respect to their producing voltages by an amount equivalent to the antenna length separating winding 5 from the respective segments. In column three of the table of Fig. 2 this is represented by means of small arrows which indicate direction only, and not current magnitudes. Summing up the individual vector currents directly propagated, it will be seen from the diagram at the bottom of the column of the table that the resultant is a maximum vector inasmuch as it is a diameter of the vector circle. Although this proof is based on a choice of spaced elemental portions, it is evident that the conditions in the antenna as a whole are fairly represented by such portions and therefore that the table indicates the resultant effect in the antenna as a whole.

The resultant reflected current is similarly determined. The conditions are as indicated in column four of the table. Current from the segment $e$ has a reversal of phase on account of reflection from the open-ended antenna and therefore arrives at winding 5 at a time corresponding effectively to a full cycle after it originates and therefore, at any given instant, as measured at winding 5 it is retarded a full cycle in respect to the voltage $e$. Reflected current occasioned by voltage $d$ travels an eighth of a cycle to the open end, is effectively retarded a half-cycle by reflection and then is retarded, by the half-wave antenna, another half-cycle before reaching coil 5. At the instant it arrives at winding 5 it is therefore retarded one and one-eighth cycles in respect to the voltage in segment $d$. The remaining vectors for the reflected currents are determined in a similar manner and their resultant is also a diameter of the vector circle as shown in the table. This last mentioned resultant, it will be observed, has the same direction as the resultant for the directly-propagated current and consequently, both resultants for the antenna of Fig. 1 add or cooperate to give a maximum total resultant or, in other words, maximum horizontal directivity. The vectors are, of course, rotating and the directions shown by the arrows are relative only.

In connection with Fig. 1 it should be noted that if the vertical antenna were one wave length in height instead of one-half wave length, a minimum or zero total vector resultant would be obtained for waves propagated in a horizontal plane. A vertical antenna one wave length in height is therefore especially adapted to reject horizontal waves. Also, in comparing vertical antennæ and tilted antennæ constructed in accordance with the invention, a vertical half-wave antenna is a suitable standard of comparison inasmuch as it possesses a maximum horizontal directional characteristic.

In Fig. 3 the antenna 7 is three-quarter's of a wave length long and is connected through one winding of transformer 8 to ground. The other winding of transformer 8 may be connected to a transmitter or receiver but for purposes of this description it will be considered as connected to a receiver. The antenna is tilted from the vertical at such an angle $\phi$ that the projection of the antenna on a plane parallel to the direction of the incoming wave, represented by the arrow 9, is one-half wave length shorter than the length of the antenna proper, that is, one-quarter wave length long for the antenna of Fig. 3. As explained vectorially below an antenna tilted at such an angle, termed herein the optimum angle for the given antenna length, possesses a maximum directional characteristic in the direction of the wave propogation. The small letters $f, g, h, i, j, k$ and $l$ represent small antenna segments spaced an eighth wave length along the antennæ.

Referring to the table of Fig. 4, and to the induced voltage column particularly, it will be seen that the voltages simultaneously induced in the segments are of relatively different phase and in this respect the system differs from that shown in Fig. 1. This results from the fact that the part of the wave inducing the voltage in any one segment is 15° or $\frac{1}{24}$ of a cycle retarded in respect to that inducing the voltage in the segment immediately above. The various phase differences between the induced elemental voltages and their resulting currents through the transformer 8 are obtained in the manner already explained in connection with Fig. 2, the currents, as in Fig. 1, being always retarded in respect to their voltages with the exception of the current directly propagated from the lowest segment. A maximum resultant is obtained for the directly-propagated current and zero resultant for the reflected current as shown at the bottom of the table of Fig. 4.

In all antennæ tilted in accordance with this invention, the resultant of the directly-propagated current is a diameter of a vector circle. The resultant of the reflected current varies from zero, in the case of antennæ having a length equal to an odd quarter multiple of a wave length, to small values when the length is an even multiple of a quarter wave length; and as the even multiple increases the reflection resultant decreases. An antenna tilted as shown in Fig. 3 has a substantially unity front to back-end ratio which may be greatly increased, that is, the effects produced by waves propagated in a direction opposite to that indicated by arrow 9 may be practically eliminated by properly terminating the antenna. It has been found, for example, that if the single wire antenna is equal in length to an odd multiple, greater than one, of a quarter wave length, a terminating impedance equal substantially to the antenna surge impedance will produce unidirectivity; and, if the antenna length equals an even multiple, greater than two, of a quarter wave length, a terminating impedance equal to the product of the antenna surge impedance and the sine of the angle of tilt of the antenna from the path of propagation will render the system unilateral. The terminations, however, would not affect the reflection phenomena and would not change the characteristic illustrated in Fig. 4 since, for single wire tilted antennæ the resultant reflected current is zero as indicated in this figure. Stated differently, if the tilted antenna has a length equal to an odd multiple of a quarter wave length, and is terminated in an impedance equal to its surge impedance, the ratio of the front to back end reception or radiation is infinity. If it has a length equal to an even multiple of a quarter wave length and is similarly terminated, the ratio is small but this ratio increases as the length, that is, as the even multiple, increases and by changing the terminating impedance to a value equal to the product of the surge impedance and the sine of the angle of tilt, the ratio may be made infinite.

Compared to the standard half-wave antenna of Fig. 1 the transmission gain obtained in using the antenna of Fig. 3 results primarily from the fact that the latter is longer and more directive than the former. The vertical antenna receives horizontally propagated waves equally from all directions whereas the tilted antenna favors two opposite directions, the directivity diagram resembling a figure eight. Compared to a vertical three-quarter wave length antenna the final resultant for the tilted antenna of Fig. 3 possesses no reflected component whereas the resultant for the vertical antenna includes a reflected as well as a directly-propagated component.

In both Figs. 2 and 4 he directly-propagated and reflected current vectors for the extreme top segment are opposite in phase to those for the extreme bottom element. This condition is necessary in all cases for maximum results. In other words, the antenna should be tilted toward or away from the incoming wave in such a manner that current originating at the top element will arrive or pass through the receiver a half-cycle later than that simultaneously originating in the bottom element. When this condition is fulfilled the antenna will be a half-wave longer than its projection on a plane parallel to the direction of the wave propagation and its angle with the projection will be the optimum one as heretofore defined.

In Fig. 5 another embodiment of the invention is shown comprising two conductors 10 and 11 each tilted at the optimum angle $\phi$ for the desired waves and joined to each other so as to form an inverted V. For purposes of illustration the length of each conductor or element has been made equal to one wave length. As in Fig. 3, this length is a half-wave length longer than the projection of the element on a plane parallel to the direction of the propagation of the desired waves. The lower terminal of conductor 10 is connected to ground through winding 12 of transformer 13. Winding 14 of this transformer is connected to either a transmitter or a receiver. The antenna system shown in this figure possesses a bidirectional characteristic but it may be made unidirectional by properly connecting the conductor 11 to ground through an impedance at "$m$". The small letters $m$ to $u$ designate infinitesimal segments located along conductors 10 and 11, the adjacent segments being a quarter-wave length apart. The arrow 15 indicates the direction of the incoming wave.

Referring to Fig. 6 a vector diagram for the structure shown in Fig. 5 is shown. The induced or spaced voltages at the elemental segments $m$ to $u$ are represented in the top row of arrows. As shown in this row of arrows, the voltage induced in segment $n$ is one-eighth of a cycle retarded over that induced in segment $m$ and similarly the voltages induced in the remaining elemental segments are one-eighth of a cycle behind that induced in the segment immediately adjacent at the right. The second row of arrows from the top represent the effective or wire voltages at the same elemental points. The effective (as regards the effect on winding 12) voltages present in conductor 10 as, for example, in segments $q$ to $u$ are opposite in phase to those induced in conductor 10 and cooperate with, rather than oppose, the effective voltages in the other of the two conductors. This is true since, so far as concerns their joint effect in winding 12, the direction of the elemental voltages in conductor 10 are reversed with respect to the voltages in conductor 11 by the bend or apex of the antenna.

The manner of determining the phase relation between the voltages and both the directly-propagated and the reflected currents passing through winding 12 has been described in connection with Figs. 1 and 2 and will be outlined only briefly here. The directly-propagated current produced by voltage $m$ will arrive at coil 12 two complete cycles behind the elemental voltage $m$ producing it, inasmuch as the antenna is two wave lengths long. Current resulting from voltage $n$ travels a distance equal to one and three-fourth wave lengths along conductors 11 and 10 and of course passes through winding 12 one and three-quarter cycles behind voltage $n$. Similarly, the direction of the other elemental directly-propagated and reflected currents may be determined bearing in mind that current flowing to the open end is reversed on reflection and therefore effectively retarded a half-cycle. For example, reflected current traveling from $m$ arrives at winding 12 in opposite phase relation to the directly-propagated current; and current originating at $n$ travels one-fourth of a wave length, corresponding to a retardation of 90°, to the free end, is retarded 180° by reflection and then travels two full wave lengths, corresponding to a retardation of 720°, to coil 12. The summations of both the direct and reflected currents are shown at the right of the table in Fig. 6. It should be observed in regard to the reflected current that the resultant for each of conductors 10 and 11 for progressively increasing numbers of segments travels 540° or one and one-half times around the vector circle and finally assumes the same direction as the resultant for the other conductor. This double resultant is added to the double resultant obtained for the directly-propagated current to give the total resultant shown at the extreme right in Fig. 6. For waves propagated in a direction opposite to that shown in this figure the direct and reflected components will be similar but opposite in direction to the reflected and direct components, respectively, shown in the figure. The total resultant will, of course, also be opposite in direction to that shown in the figure. The system of Fig. 5 is therefore bilaterally directive and equally responsive to waves propagated in both directions.

In Fig. 7 a unidirectional receiving system is shown comprising two inverted V antennæ 16 and 17. Antenna 16, the reflector, is spaced one-fourth of a wave length farther away from the wave source and in the same vertical plane as antenna 17, the exciter. The arrow 18 indicates the direction of the wave propagation. Each tilted conductor or element has a length "$w$" wave lengths long and is positioned at the optimum angle $\phi$ for horizontal directivity so that the horizontal projection of each element is a half-wave length shorter than the element length or $w - \frac{\lambda}{2}$ wave lengths. Reference numeral 19 represents a transformer utilized for connecting the exciter 17 to the receiver. Numerals 20 and 21 refer, respectively, to an inductance coil and a condenser employed for properly terminating the reflector 16.

Unidirectivity is achieved by means of the reflector in a manner which is familiar to those skilled in the art. The voltage induced in conductor 16 by the desired waves is retarded one-fourth of a cycle in respect to that induced in conductor 17. Since the field reradiated from conductor 16 is opposite in phase to that of the space field immediately adjacent and since there is a quarter-wave length spacing between the reflector and exciter, energy from the inverted V antenna 16 induces a voltage in antenna 17 in phase with the voltage induced in the latter. The resulting currents therefore assist each other and reception in this direction is a maximum. Waves from the opposite direction, however, induce a voltage in the reflector 16 which leads that simultaneously induced in the exciter 17 by a quarter cycle. Because of the 180° phase change due to reradiation and the quarter-wave length spacing, the voltage induced in the exciter 17 by energy from the reflector 16 is opposite in phase to that then being induced in the exciter. Currents induced by energy from this undesired direction are therefore effectively suppressed.

In Fig. 8 polar directional characteristic curves in the vertical plane which have been mathematically calculated are shown for a linear receiving antenna having a length equal to one wave length and connected to a perfect ground. The dotted line curve 22 containing two loops represents the characteristic when the antenna is vertically positioned and the full line curve 23 when the antenna is tilted 30° from the vertical in a vertical plane which includes the point of propagation. Along the horizontal axis the distance designated one hundred per cent represents the maximum desired current obtainable theoretically for this system. When the antenna is tilted in any other vertical plane the desired current will be less than the maximum just mentioned. A study of these curves reveals the fact that there is practically no reception in the horizontal direction when this antenna is in vertical position whereas when it is tilted 30° in the path of the incoming wave, there is a maximum reception of desired waves. Furthermore, the position of the minor lobe for the tilted antenna indicates that this antenna has a very good characteristic for waves propagated vertically as well as horizontally. In other words it has a high angle of response and therefore is particularly adapted for minimizing static if static is more intense at angles relatively close to the earth's surface as it is believed to be. For the same reason the absorbed energy including that reflected by the Heaviside layer arrives over comparatively few transmission paths with the result that fading is materially reduced. The antenna represented possesses a bidirectional characteristic but as explained heretofore it may be made unidirectional by either the use of a reflector or a proper terminating impedance.

In Fig. 9 an inverted V type antenna 24 such as heretofore described is shown arranged so that the vertical plane of the antenna may be changed to any desired direction. The particular arrangement shown in this figure is illustrative only, and it should be understood that any suitable scheme for changing the direction of the vertical plane so as to include therein a distant transmitting or receiving station could be utilized in place of the rotating means shown here.

The system schematically shown in this figure comprises a circular track 25 located in a horizontal plane and connected through insulators 26 and 27 to both lower terminals of the inverted V. One terminal is grounded through one winding of transformer 28 which is associated with a translation system such as a transmitter or receiver. The other terminal is connected through a terminating impedance 29 to ground for the purpose of obtaining a unidirectional characteristic. The plane of the antenna may be rotated about the supporting tower 30 in either direction, the antenna conductors being kept in the same plane by means of suitable guy wires as shown. The antenna proper functions the same as the one shown in Fig. 5 and in addition thereto it is unidirectional and adjustable to the optimum plane for transmission or reception. It is shown in the drawings in the optimum position for receiving waves propagated in the direction indicated by the arrow 31.

In Fig. 10 one scheme of adjusting or changing the tilt of the antenna to the optimum angle $\phi$ for transmitting or receiving waves of any given wave length within certain limits is illustrated. The reference number 32 represents a horizontal track suitably supported and along which the conductor or element 33 of the inverted V type antenna 34 may be moved. The antenna is supported by a pulley 35 which in turn is supported by a pole or tower 36 and connected to a counterweight 37 so that when the conductor moves from the position shown by the full line to the position shown by the dotted line the combination of the pulley and counterweight cooperate to maintain each element of the antenna 34 equal in length and the angle of tilt of each element equal to that of the other. The antenna is connected to ground through transformer 38 which is connected to a receiver for receiving waves from the direction shown by the arrow 39. A transmitter could, of course, be used on this system in place of the receiver. If each side of the inverted V is several wave lengths long the apex of the V moves through a comparatively small distance as will be evident from the description given below of the curve of Fig. 13. The scheme used in Fig. 10 could of course be combined with that used in Fig. 9 so that an antenna system could be constructed which would be adjustable to different optimum angles and at the same time capable of being rotated to any desired direction for maximum directivity. Such a system would be especially suitable for use on boats and aircraft and in places where it is impractical to construct an antenna such as shown in Figs. 11 and 12 to be described.

Figs. 11 and 12 illustrate, respectively, an

"end-on" and a "broadside" antenna array of inverted V type antenna units of the invention. The "end-on" array and transmission system shown schematically in Fig. 11 comprises an exciter 40 and a reflector 41 each of which in turn comprises four inverted V sections, constructed in accordance with the invention and connected electrically to each other as shown. Practically any number of sections may be utilized, the number illustrated being arbitrarily chosen. Both the exciter and reflector are arranged in the same vertical plane with each other and with the distant cooperating station, and each reflector section is one-quarter of a wave length farther away from the distant station than its corresponding exciter section. The exciter is conductively connected through a transformer 42 to ground and inductively associated with a transmission line 43 to a translation device. The deflector is grounded through an impedance comprising coil 44 and condenser 45. The arrow 46 indicates the direction of the wave. The system shown in Fig. 11 is particularly suitable for use where considerations of ground space are not of primary importance. It possesses a very sharp unidirectional characteristic which may be greatly improved by properly choosing the number of the sections or inverted V antennæ.

In Fig. 12 a broadside antenna arrangement is schematically shown in perspective. It comprises an exciter row 47 of inverted V sections, such as 48, all the apexes of which are in a plane perpendicular to the direction of the wave propagation, represented by the arrow 49. The sections are spaced from each other the proper distance which, for a given number of sections, will produce the sharpest unidirectional characteristic. In the same plane with each exciter section and one-quarter of a wave length farther away from the distant station is another inverted V type section, such as 50. These sections form a row 51 which comprises the reflector. Both the exciter and the reflector may consist of any number of sections and are not intended to be limited to the number shown on the drawing.

The transmission system shown in Fig. 12 is designed so that current flowing from each of the exciter sections to the winding 52 of transformer 53 traverses a distance equal to that which is traversed by currents flowing from the remaining exciter sections. Similarly, in the transmission system shown associated with the reflector sections, the current flowing from each reflector section to ground through the terminating impedance comprising coil 54 and condenser 55 traverses a distance equal to that traversed by the current flowing from the other reflector sections. The transmission system therefore does not affect the phase relation between the currents of the various sections. Winding 56 of transformer 53 is connected to a receiver.

The operation of the system shown in Figs. 11 and 12 is similar to that of the well known end-on and broadside arrays, respectively. When the end-on system is used for receiving purposes the energy absorbed in each section is serially combined with that absorbed in the other sections, and certain sections serve as a transmission line for energy absorbed in other sections. When the broadside array of Fig. 12 is used for receiving purposes the corresponding elements are simultaneously energized by the incoming wave and the sections are in a sense parallel to each other. A more detailed description of the end-on and broadside systems may be found in the applicant's copending applications Serial No. 173,833, filed March 9, 1927 and Serial No. 235,464, filed November 25, 1927, respectively. In both systems the vector resultant for each section effective at the transformer possesses the same direction as the other sections. Both systems may, of course, be employed for transmitting purposes with the same degree of success.

Referring to Fig. 13 two curves are shown, one of which serves as a means of determining the tilt from the vertical in the vertical plane including the distant station for different lengths of a linear antenna for the condition of maximum horizontal directivity and the other of which similarly determines the tilt for minimum horizontal directivity. Both curves possess a relatively flat characteristic for antenna lengths greater than five wave lengths. An examination of the curve for maximum horizontal directivity shows that the angle of tilt for an antenna five wave lengths long is 64° approximately and one ten wave lengths long is 72° approximately. Because of this small difference of 8° approximately, it is apparent that an antenna five wave lengths long and tilted the mean of the above optimum angles that is, 68°, toward the incoming wave would be suitable for use over a frequency range in which the high frequency is double that of the low. These curves therefore disclose one of the important features of the invention, namely, that a tilted antenna is particularly well adapted for use over a comparatively large frequency range. Also, it may be seen from a comparison of the two curves that an antenna tilted for maximum horizontal directivity may easily be adapted for minimum horizontal directivity because of the small difference, for an antenna of given length, between the optimum angles for maximum and minimum directivity.

From the curves in Fig. 14 the horizontal and vertical projections of antennæ tilted at various optimum angles may easily be determined. The curve also illustrates in another way the fact that for every antenna above five wave lengths long there is little difference in the various optimum angles and that an antenna several wave lengths long and tilted in accordance with the invention is admirably suited for use for several different frequencies.

From the curves in Fig. 15 the gain realized in using a single tilted wire, an inverted V antenna, and a double inverted V antenna of various lengths over the standard half-wave vertical antenna may be determined. As pointed out before, part of the gain obtained is due to the increased length employed in the tilted antenna as compared to the vertical half-wave standard and part is due to the fact that the antenna radiation resistance is decreased through the sharper directivity. Curves for the different types of arrays illustrated in Figs. 11 and 12 have been omitted from the drawing. It is sufficient to say that such arrays obviously possess greater transmission gains than that of the single sections whose gain over the standard are shown in Fig. 15.

In Fig. 16, two inverted V-sections 57 and 58 each constructed in accordance with the invention, are illustrated, one being disposed in a vertical plane and the other in a horizontal plane. The two sections are joined at the common extremities or terminals 60 and 61. The length $w$ of each leg of the antennæ is a half wave length longer than the projection of the leg on the path of the wave propagation designated by numeral 59. Extremity 60 is connected to ground 62 through a terminating impedance 63 which, as explained above, is of such value as to render the system unilateral and which, as also explained above, in certain cases only is equal to the surge impedance of the antenna. The other terminal 61 is connected to ground 64 through the primary winding of transformer 65, the secondary of which is associated by means of line 66 with a receiver not shown on the drawings.

The operation of the system shown in Fig. 16 is apparent in view of the discussion given above with respect to the previously described figures. It should be noted, however, that the antennæ 57 and 58 favor different components of the same wave. Antenna 57, for example, absorbs a maximum amount of energy from the vertical component 67 of the polarized wave 68 and substantially no energy from the horizontal component 69. On the other hand, antenna 58 absorbs a maximum amount of energy from the horizontal component 69 and little, if any, energy from the vertical component 67. Obviously the two antennæ may be used jointly, as illustrated, or separately.

While the invention has been described in connection with certain specific embodiments it is clear that the invention may be suitably employed in many other embodiments, and it is not intended to limit the invention to those illustrated. For example, arrays comprising single tilted conductors such as illustrated in Fig. 3, and other double inverted V systems comprising a plurality of inverted V antennæ lying in different planes with their apexes or extremities superimposed may well be employed.

What is claimed is:

1. An antenna comprising a conductor positioned at an angle greater than zero degrees and less than ninety degrees to a plane perpendicularly related to the path of propagation of a wave and having a length substantially equal to a half-wave length of the desired wave plus the projection of the antenna on the path of the propagated wave.

2. A directive antenna system comprising one or more linear conductors at least one of which is inclined with respect to the vertical and is equal in length to substantially a half-wave length of the desired waves plus its projection on the path of the said waves.

3. A transmitting antenna comprising a conductor inclined to the vertical to such a degree that its projection on the horizontal is substantially equal to a multiple of one wave length.

4. A radio antenna comprising a conductor inclined to the vertical to such a degree that its projection on the horizontal is substantially equivalent to one wave length, the antenna having a linear dimension substantially equal to a multiple of a half wave length.

5. An antenna comprising a tilted conductor having a length substantially equal to a half wave length of the desired waves plus the projection of the antenna in the path of the waves, a receiver connected to one terminal and a suitable terminating impedance connected to the other terminal of the antenna.

6. A directive antenna for receiving a plurality of desired waves comprising a tilted conductor having a length of the order of five to ten wave lengths of the longest desired wave and tilted in the plane of wave propagation at an angle of the order of 18° to 25° from the path of propagation.

7. A tilted antenna for receiving a plurality of waves having a length greater than substantially five wave lengths of the longest desired wave and tilted in the plane of wave propagation at an angle less than 25° from the path of propagation so that the radiant energies of various wave lengths within a desired range which are absorbed by its terminal segments yield oppositely directed effects substantially when one of the energies is superimposed upon the other, and a translation device associated with the antenna.

8. An antenna comprising two conductors each positioned at an angle greater than zero degrees to the plane of polarization and each having a length equal to a half-wave length of the desired waves plus its projection in the path of the wave propagation, the uppermost terminals of said conductors being joined.

9. A V-shaped antenna section comprising one conductor tilted toward and another conductor tilted away from the incoming wave, said conductors being of equal length and having a common terminal, said length being substantially equal to a half-wave length of the desired wave plus the projection of the conductor in the path of the waves, and a translation device associated with said section at a conductor terminal thereof.

10. An inverted V-shaped antenna section comprising one conductor tilted toward and another conductor tilted away from the incoming wave, said conductors being of equal length and joined at the top, said length being substantially equal to a half-wave length of the desired wave plus the projection of the conductor in the path of the waves, a receiver connected to the lower terminal of one conductor, and a suitable terminating impedance connected to the lower terminal of the other conductor.

11. A directive antenna system comprising a plurality of V-shaped sections lying in the same plane with each other and with a distant cooperating station, one of the said sections being an odd multiple of a quarter wave length of the desired wave farther away from said distant station than the other of the said sections.

12. A double-inverted V-antenna system comprising an inverted V-shaped exciter and an inverted V-shaped reflector, each comprising conductors tilted for maximum directivity, said exciter and reflector being in the same plane with each other and with the path of the desired incoming waves, the reflector being a quarter wave length farther away from the source of said waves than the exciter, a receiver connected to the exciter, and an impedance connected to the reflector.

13. A directive antenna system comprising a plurality of inverted V-shaped sections comprising conductors each positioned at an acute angle to the plane of polarization of the desired wave and each having a length equal to a half-wave length of the desired wave plus its projection on the path of wave propagation, said sections lying in different planes and having common terminals.

14. In combination, an inverted V-shaped antenna comprising tilted conductors each having a length equal to a half wave length of the desired wave plus its projection on the path of wave propagation, said antenna being rotatably supported at its apex, and one terminal of said antenna being connected to a translation device and the other terminal to a terminating impedance.

15. In combination with one or more inverted V-shaped antenna sections each comprising oppositely tilted conductors, the length of each of which is equal to a half wave length of a desired wave plus the conductor projection on the path of said wave, means for changing the plane of the antenna section to any desired direction.

16. In combination with an inverted V-shaped antenna, means for changing the tilt of each conductor thereof an equal amount, the tilt of each conductor of the antenna being adjusted so that the difference between its length and its projection on the path of a desired wave equals substantially a half wave length of said wave.

17. In combination, an inverted V-shaped antenna the apex of which is adjustably supported and one terminal thereof movable in the path of the desired waves, the tilt of each conductor being adjusted so that the difference between its length and its projection on the path of a desired wave equals substantially a half wave length of said waves, a translation device connected to the other terminal of said antenna.

18. In combination, a plurality of inverted V-shaped antenna sections each comprising two conductors, means for rotating the vertical plane of at least one of the said sections, means for equally changing the tilt of the conductors to any desired angle, the tilt of each conductor being adjusted so that the difference between its length and its projection on the path of a desired wave equals substantially a half wave length of said wave, a receiver connected to one terminal and a suitable impedance to the other terminal of the said section.

19. An end-on unidirectional antenna array for receiving waves from a distant source comprising an exciter and a reflector lying in the same plane, said exciter and reflector each comprising a plurality of V-shaped antenna sections colinearly arranged and electrically connected, said sections comprising conductors tilted so that the length of each conductor is equal to its projection on the path of the received waves plus one-half wave length of said waves, each reflector section being positioned a quarter wave length farther away from said source than a corresponding exciter section, a receiver connected to the exciter, and a suitable terminating impedance connected to the reflector.

20. A broadside unidirectional antenna array for receiving waves from a distant source comprising an exciter and a reflector, said exciter and reflector each comprising a plurality of parallel V-shaped sections having conductors tilted so that the length of each conductor is equal to its projection on the path of the received waves plus one-half wave length of said waves, each exciter section being in the same plane with a reflector section, the exciter sections being positioned an equal distance from said source and each reflector section a quarter wave length farther away from said source than its corresponding exciter section, a receiver associated with the exciter, and a suitable terminating impedance associated with the reflector.

21. An antenna comprising a conductor having a length substantially equal to an odd multiple of a quarter wave length of a given wave, said antenna being tilted at an angle such that its projection on the path of said wave is equal to the antenna length minus a half wave length, an impedance connected to one terminal of said antenna, said impedance being equal to the surge impedance of the antenna.

22. An antenna comprising a conductor having a length substantially equal to a multiple of a half wave length of a given wave, said antenna being tilted at an angle such that its projection on the path of said wave is equal to the antenna length minus a half wave length, an impedance connected to one terminal of said antenna, said impedance being equal to the product of the antenna surge impedance and the sine of said angle.

In witness whereof, I hereunto subscribe my name this 5th day of October, 1929.

EDMOND BRUCE.